(12) United States Patent
Telling

(10) Patent No.: US 10,546,167 B2
(45) Date of Patent: *Jan. 28, 2020

(54) SYSTEM AND METHOD OF OPERATING A MANUFACTURING CELL

(71) Applicant: FARO Technologies, Inc., Lake Mary, FL (US)

(72) Inventor: Gary L. Telling, Hendersen, NV (US)

(73) Assignee: FARO TECHNOLOGIES, INC., Lake Mary, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/145,921

(22) Filed: Sep. 28, 2018

(65) Prior Publication Data

US 2019/0034674 A1 Jan. 31, 2019

Related U.S. Application Data

(63) Continuation of application No. 15/594,764, filed on May 15, 2017, now Pat. No. 10,108,829, which is a
(Continued)

(51) Int. Cl.
*G01C 21/00* (2006.01)
*G06K 7/10* (2006.01)
(Continued)

(52) U.S. Cl.
CPC .......... *G06K 7/10405* (2013.01); *B25J 9/161* (2013.01); *B25J 9/1676* (2013.01); *B25J 15/04* (2013.01);
(Continued)

(58) Field of Classification Search
CPC .......... G06K 7/10405; G06K 7/10376; G06K 7/10297; G06K 7/10554; B25J 15/04;
(Continued)

(56) References Cited

U.S. PATENT DOCUMENTS 6,615,112 B1 9/2003 Roos
7,169,141 B2 1/2007 Brock et al.
(Continued)

FOREIGN PATENT DOCUMENTS

EP 1555507 A1 7/2005
JP 2012040669 A 3/2012

OTHER PUBLICATIONS

Fuchs, S., et al, "Cooperative bin-picking with Time-of-Flight camera and impedance controlled DLR lightweight robot III", Intelligent Robots and Systems (IROS), 2010 IEEE/RSJ International Conference on, IEEE, Piscataway, NJ, USA, Oct. 18, 2010 (Oct. 18, 2010), pp. 4862-4867, XP031920561, DOI: 10.1109/IROS. 2010.5651046; ISBN: 978-1-4244-6674-0, abstract; figures 1,2,5.
(Continued)

*Primary Examiner* — Ian Jen
(74) *Attorney, Agent, or Firm* — Cantor Colburn LLP

(57) ABSTRACT

A system and method for operating a manufacturing cell is provided. The system includes an articulated arm having a plurality of arm segments, each of the arm segments having a transducer. An end effector is coupled to an end of the articulated arm. An electronic circuit is configured in operation to determine a position and orientation of the end effector. A sensor measures in operation a position of an operator. A tool is removably coupled to the end effector. A three-dimensional (3D) scanner is configured in operation to determine three-dimensional coordinates of a surface of an object, the 3D scanner being removably coupled to the end effector. A controller determines when the operator is within a predetermined distance of the articulated arm and altering a speed or a movement of the articulated arm to avoid contact or reduce the impact of contact between the operator and the articulated arm.

20 Claims, 6 Drawing Sheets

Related U.S. Application Data continuation of application No. 14/886,135, filed on Oct. 19, 2015, now Pat. No. 9,656,390.

(60) Provisional application No. 62/077,513, filed on Nov. 10, 2014.

(51) Int. Cl.
  *B25J 9/16* (2006.01)
  *B25J 15/04* (2006.01)
  *B25J 19/02* (2006.01)

(52) U.S. Cl.
  CPC ......... *B25J 15/0408* (2013.01); *B25J 19/021* (2013.01); *G06K 7/10297* (2013.01); *G06K 7/10376* (2013.01); *G06K 7/10554* (2013.01); *Y10S 901/09* (2013.01)

(58) Field of Classification Search
  CPC ........ B25J 19/021; B25J 9/1676; B25J 9/161; B25J 15/0408; Y10S 901/09
  See application file for complete search history.

(56) References Cited

U.S. PATENT DOCUMENTS

| | | |
|---|---|---|
| 8,836,768 B1 | 9/2014 | Rafii et al. |
| 8,854,433 B1 | 10/2014 | Rafii |
| 2003/0164200 A1* | 9/2003 | Czeranna ............... B62D 65/18 141/1 |
| 2007/0073439 A1* | 3/2007 | Habibi .................. B25J 9/1697 700/213 |
| 2011/0022231 A1* | 1/2011 | Walker ................. A01D 46/264 700/259 |
| 2012/0173017 A1 | 7/2012 | Balkin |
| 2012/0259455 A1 | 10/2012 | Balkin |
| 2013/0186999 A1 | 7/2013 | Huber |
| 2014/0128225 A1 | 5/2014 | Weck |
| 2014/0371910 A1* | 12/2014 | Hayashi ................ B25J 9/1697 700/259 |
| 2017/0173795 A1* | 6/2017 | Tan ........................ B25J 9/1666 |
| 2018/0126553 A1* | 5/2018 | Corkum ................ B25J 9/1697 |
| 2019/0034674 A1* | 1/2019 | Telling .................. B25J 9/1676 |

OTHER PUBLICATIONS

Haddadin, Sami, et al., "Towards the Robotic Co-Worker" In: "Robotics Research.: the 14th International Symposium ISRR/ Cedric Pradalier . . . (ed.)" Jan. 1, 2011 (Jan. 1, 2011), Berlin [u.a.]: Springer, 2011, DE, XP55240478, ISBN: 978-3-642-19456-6; vol. 70, pp. 261-282, DOI: 10.1007/978-3-642-19457-3_16, abstract: figures 1,6 p. 274, paragraph 2—p. 275, paragraph 2.

International Search Report and Written Opinion for International Application No. PCT/US2015/056622 dated Jan. 25, 2016; (15 pgs).

* cited by examiner

SYSTEM AND METHOD OF OPERATING A MANUFACTURING CELL

CROSS-REFERENCE TO RELATED APPLICATIONS

The present application is a Continuation Application of U.S. application Ser. No. 15/594,764 filed on May 15, 2017, which is a Continuation Application of U.S. application Ser. No. 14/886,135 filed on Oct. 19, 2015, now U.S. Pat. No. 9,656,390, which is a Nonprovisional Application of U.S. Provisional Application Ser. No. 62/077,513 filed on Nov. 10, 2014, the contents of both of which are incorporated herein by reference.

BACKGROUND

The subject matter disclosed herein relates to a human friendly or human-centric robot for use in a manufacturing environment, and in particular to a human-centric robot that is configured to inspect objects to determine conformance with predetermined characteristics.

Robotic devices have been widely used in manufacturing and other environments to reduce costs and improve quality. Robotic devices are hard/rigid bodies that may move in a rapid and unpredictable manner. To avoid unintended impact with human operators, a typical manufacturing cell includes a lock-out procedure whereby the robot device is disabled when human operators need to enter the area. By locking out the robotic device it is ensured that the risk of impact by a moving robot is eliminated.

One type of robotic device has been developed, referred to as a human-centric robot, which allows the robot and the human operator to work in close proximity to each other while minimizing the risk of impact to the human operator. These human-centric robots have been proposed and used in a variety of applications, including medical facilities, libraries and manufacturing assembly operations. Human-centric robots include sensors that allow them to monitor their surrounding area including the presence of humans. The robot's controller is programmed to receive these sensor inputs and predict the risk of impact with nearby humans. When a potential impact on a human is detected, the robot takes mitigating actions (e.g. slowing down or changing direction) to avoid contact. In manufacturing environments, these human-centric robots have found use in light assembly and small part manufacturing.

Accordingly, while existing robotic devices used in manufacturing environments are suitable for their intended purpose the need for improvement remains, particularly in providing a human-centric robot that is capable of operating in close proximity to a human operator and also allows for automated inspection of an object.

BRIEF DESCRIPTION

According to one aspect of the invention, a system is provided. The system includes an articulated arm having a plurality of arm segments, each of the arm segments having a transducer. An end effector is coupled to an end of the articulated arm. An electronic circuit is configured in operation to determine a position and orientation of the end effector. At least one sensor measures in operation a position of an operator. At least one tool is removably coupled to the end effector. A three-dimensional (3D) scanner is configured in operation to determine three-dimensional coordinates of a surface of an object, the 3D scanner being removably coupled to the end effector. A controller is provided having a processor, the processor configured to execute computer executable instructions when executed on the processor to determine when the operator is within a predetermined distance of the articulated arm and altering a speed or a movement of the articulated arm to avoid contact or reduce the impact of contact between the operator and the articulated arm.

According to another aspect of the invention, a method of operating an manufacturing cell is provided. The method comprising: providing a robotic articulated arm, the articulated arm having a movable end effector and a plurality of transducers arranged to transmit a position signal to an electric circuit, the robot further including at least one sensor configured to transmit a position signal for determining a position of a human operator, the robot configured to operate directly adjacent to a human operator based at least in part on the position signal; providing at least one tool; providing a three-dimensional (3D) scanner; receiving an object signal; coupling the 3D scanner to the end effector in response to receiving the object signal; determining three-dimensional coordinates of at least one feature of the object with the 3D scanner coupled to the end effector; and transmitting the three-dimensional coordinates to a processing circuit associated with the object; and calibrating the object based on the three-dimensional coordinates transmitted to the processing circuit.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Embodiments of the present invention provide advantages in providing automated inspection of objects being manufactured in an environment where human operators and robots operate in close proximity to each other. Embodiments of the present invention allow for cost effective inspection of objects being made or fabricated earlier in the manufacturing process to allow errors to be addressed earlier in the manufacturing process to reduce the cost of scrap and rework of the objects.

Figure 1:
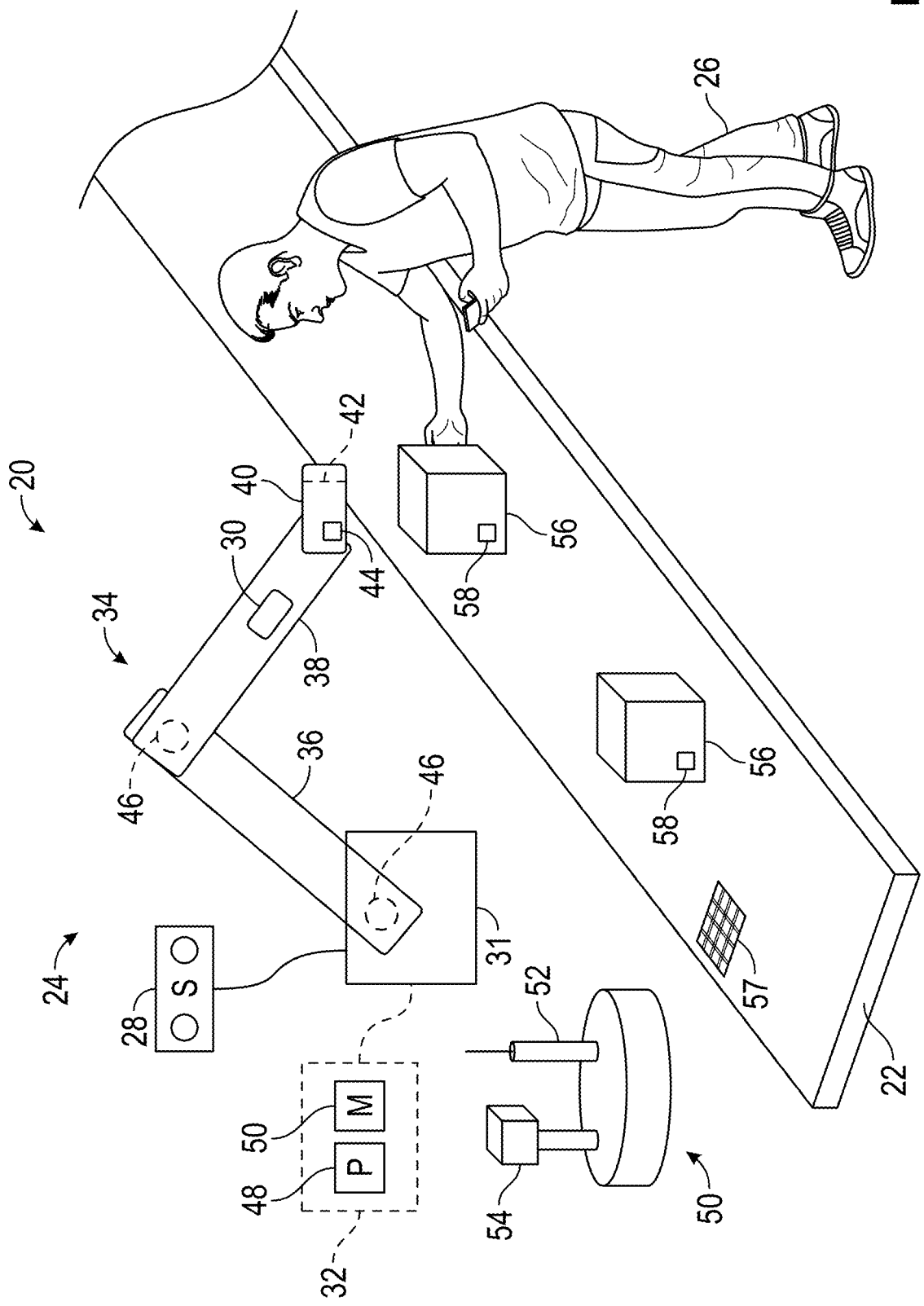
FIG. 1 is an illustration of a manufacturing cell having a human-centric robot in accordance with an embodiment of the invention.

Referring now to FIG. 1, a manufacturing cell 20 is illustrated in accordance with an embodiment. The cell 20 includes a work surface 22, such as a benchtop or a conveyor for example. In the exemplary embodiment, the cell 20 includes a robotic device 24, such as a human-centric robot for example. As used herein, a human-centric robot 24 is a robotic device that is configured to operate autonomously or semi-autonomously in close proximity to a human operator 26. As used herein, the phrase "close proximity" means that the human-centric robot 24 and the operator 26 are positioned such that portions of the human-centric robot 24 may move within areas that overlap with the human operator 26 during operations. As such, the human-centric robot 24 may include sensors 28, 30 that allow the human-centric robot 24 to determine if the operator 26 is within a predetermined distance of a moving part of the human-centric robot such that there is a risk of contact. A controller 32 is configured to alter the speed or movement of the human-centric robot 24 to either avoid contact or reduce the impact on the human operator 26 in the event of contact. In an embodiment, the human-centric robot is configured to have a velocity at the point of contact of less than or equal to 25 meters/second, a maximum dynamic power of less than or equal to 80 Watts, or a maximum static force of less than or equal to 150 Newtons. The sensors 28, 30 may include a visual sensor 28 (e.g. stereoscopic cameras) that is capable of scanning an area or a localized sensor 30, such as a load cell or proximity sensor for example. These sensors transmit a position signal that allows the determination of the position of the human operator. In one embodiment, the human-centric robot may incorporate the characteristics for inherent safety described in the journal article "A New Actuation Approach for Human-centric Robot Design" by Zinn et al. (Int. J of Robotics Research, Vol. 23, No. 4-5, April-May 2004, pp. 379-398), the content of which is incorporated herein by reference. In another embodiment, the human-centric robot may include the characteristics described in journal article "Safety Evaluation of Physical Human-Robot Interaction via Crash Testing" by Haddadin et al. (Pro. of Robotics: Science and Systems III, June 2007), the content of which is incorporated herein by reference. In another embodiment, the human-centric robot may comply with ISO Standard ISO/DTS 15066, ISO/TR 13482:2014 or ISO 10218 for example, the contents of which are incorporated by reference herein.

It should be appreciated that the human-centric robot 24 may also include additional features, such as bumpers or padding for example, that reduces the risks associated with a robot operating autonomously or semi-autonomously in the proximity of a human operator. In the illustrated embodiment, the human-centric robot 24 includes a base 31 with an articulated arm 34 have two or more arm segments 36, 38. Arranged at the end of the arm 34 is an end effector 40. As will be discussed in more detail herein, in the exemplary embodiment the end effector 40 includes a coupler 42 that is sized to accept a tool. In one embodiment, the end effector 40 includes a reader circuit 44. The reader circuit 44 is configured to receive or acquire a machine readable code, such an optical code (e.g. bar code) or an electromagnetic radiation code (e.g. near field communication signal, radio frequency identification signal (RFID), WiFi signal or Bluetooth signal). Where the reader circuit 44 is configured to receive an optical code, the reader circuit 44 may include an optical scanner configured to transmit a light and acquire an image of the machine readable code. In one embodiment, the machine readable code is transmitted audibly, such as by a spoken word of the human operator for example. In this embodiment, the reader circuit 44 may include a microphone.

The arm 34 further includes a plurality of transducers 46. In the exemplary embodiment, each one of the transducers 46 is associated with one of the axis of rotation of the arm segments 36, 38 to measure the rotation of the arm segment. The transducer 46 may be a rotary encoder for example. Each of the transducers 46 is electrically coupled to transmit a signal to the controller 32 in response to the rotation of the associated arm segment. In this manner, the controller 32 may determine the position and orientation of the end effector 40 and any portion of the arm 34.

It should be appreciated that while embodiments herein illustrate the human-centric robot as being stationary with a multi-axis articulated arm, this is for exemplary purposes and the claimed invention should not be so limited. In other embodiments, the human-centric robot may be mobile, have multiple articulated arms, have multiple actuators/couplers or a combination thereof for example.

Controller 32 is a suitable electronic device capable of accepting data and instructions, executing the instructions to process the data, and presenting the results. Controller 32 may accept instructions through user interface, or through other means such as but not limited to electronic data card, voice activation means, manually-operable selection and control means, radiated wavelength and electronic or electrical transfer. Therefore, controller 32 can be a microprocessor, microcomputer, a minicomputer, an optical computer, a board computer, a complex instruction set computer, an application specific integrated circuit (ASIC), a reduced instruction set computer (RSIC), an analog computer, a digital computer, a molecular computer, a quantum computer, a cellular computer, a superconducting computer, a supercomputer, a solid-state computer, a single-board computer, a buffered computer, a computer network, a desktop computer, a laptop computer, a scientific computer, a cellular phone or a hybrid of any of the foregoing.

Controller 32 is capable of converting the analog voltage level provided by sensors 28, 30, encoders 46 and reader circuit 44 into a digital signal. In one embodiment, the sensors 28, 30, encoders 46 or reader circuit 44 may be configured to provide a digital signal to controller 32, or an analog-to-digital (A/D) converter (not shown) maybe coupled between sensors 28, 30, encoders 46 or reader circuit 44 and controller 32 to convert the analog signal into a digital signal for processing by controller 32. In other embodiments, the signals may be transferred between the sensors 28, 30, encoders 46, reader circuit 44 and controller 32 by fiber optic cables. Controller 32 uses the digital signals act as input to various processes for controlling the human-centric robot 24. The digital signals represent one or more human-centric robot data including but not limited to the proximity distances to the human operator, machine readable code and arm segment rotation for example.

In general, controller 32 accepts data and is given certain instructions for the purpose of comparing the data to predetermined parameters. The controller 32 compares the parameters to predetermined variances (e.g. the arm 34 is approaching the human operator) and if the predetermined variance is exceeded may generate a signal that may be used to change the operation of the human-centric robot or indicate an alarm to the human operator. In one embodiment, the controller 32 may be configured to transmit an alert signal to a remote computer (not shown) or to transmit a signal via another communications medium, such as a cellular SMS (text message) signal to a predetermined third party for example.

The controller 32 may include an electronic circuit. The electronic circuit may include a processor 48 coupled to one or more memory devices 50. The memory devices 50 may include random access memory (RAM) device, a non-volatile memory (NVM) device or a read-only memory (ROM) device. The processor 48 may also be coupled to one or more input/output (I/O) controllers and a LAN interface device via a data communications bus.

The memory devices store an application code, e.g., main functionality firmware, including initializing parameters, and boot code, for the processor. Application code also includes program instructions for causing processor to execute any operation control methods, including starting and stopping operation, and determining the probability of the arm 34 contacting the human operator 26, based on the output voltage signal, and generation of alarms. The application code may create an onboard telemetry system may be used to transmit operating information between the human-centric robot 24 and a remote terminal location and or/receiving location. As will be discussed in more detail below, the operation control methods may include measuring coordinates or points on an object 56 being worked on in the cell 20.

It should be appreciated that the controller 32 may be remotely located from the base 31. In an embodiment, the human-centric robot 24 may include a communications circuit (e.g. WiFi, Bluetooth, cellular, Ethernet) that transmits the output voltage signal to the remotely located controller 36. In one embodiment, the controller 32 may be a cellular phone that connects to the human-centric robot 24 via a wired or wireless communications medium.

In the exemplary embodiment, the human-centric robot 24 includes a tool magazine 50 arranged to receive and store tools 52 and noncontact measurement device 54. The tool magazine 50 includes a plurality of tool holders that are similarly configured to receive the shank or gripping portion of a tool 52 and noncontact measurement device 54. The tools 52 and noncontact measurement device 54 may be selectively transferred by the controller 32 between the tool magazine 50 and the coupler 42 automatically during operation, such as in response to a signal from reader circuit 44 for example.

It should be appreciated what while the tool magazine 50 is illustrated with the holders extending perpendicular to the tool magazine 50, this is for exemplary purposes and other tool magazine and tool holder configurations are possible. For example, the tool magazine may have holders that extend radially from the outer diameter/periphery of the tool magazine. In another embodiment, the tool magazine may include a conveyor type system that follows a serpentine path. Further, while the tool magazine 50 is illustrated as being mounted directly adjacent the human-centric robot 24, in other embodiments, the tool magazine may be remotely located and may be retrieved by a separate robotic device. Further, the tool magazine may be remotely located in an enclosure that may be selectively isolated (e.g. with a movable door) to shield the tool magazine and the tools stored therein from debris, cooling fluid and lubricants used during the manufacturing process within cell 20.

In one embodiment, the manufacturing assembly line 20 receives an object 56 that will be processed by the human-centric robot 24 or the human operator 26. It should be appreciated that while the object 56 is illustrated as a single item, this is for exemplary purposes and the object 56 may be comprised of a plurality of components or subassemblies that may require assembly by the human-centric robot 24 or the human operator 26. The plurality or collection of components or subassemblies may be arranged in a kit for example. The object 56 may also require fabrication process steps, such as but not limited to machining, welding, bonding for example. The object 56 may also require chemical processing for example.

The object 56 may include an associated communications module 58. As will be discussed in more detail below, the communications module 58 may include one or more submodules, such as a near field communications circuit (NFC), a cellular teleconference circuit (including LTE, GSM, EDGE, UMTS, HSPA and 3GPP cellular network technologies), a Bluetooth® (IEEE 802.15.1 and its successors) circuit and a Wi-Fi (IEEE 802.12) circuit for example. For exemplary purposes, the communications module 58 will be described in reference to an NFC communications module, however, it should be appreciated that the communications module 58 may incorporate any of the foregoing communications protocols or a combination thereof.

The NFC communications module 58 may be a passive device, meaning that the communications module stores information that is transmitted in response to an external radio frequency signal. In one embodiment, the NFC communications module 58 is a single port NFC tag, such as MIFARE Classic Series manufactured by NXP Semiconductors for example. The NFC communications module 58 stores data regarding the object 56, such as but not limited to: manufacturing process instructions, inspection instructions, object 56 identification information (e.g. part number), and dimensional data information from preceding manufacturing processes.

It should be appreciated that in other embodiments, other communications protocols may be used rather than NFC. In another embodiment, a radio frequency identification (RFID) protocol is used. An RFID module or RFID "tag" operates in a similar manner to NFC communications module except that the RFID module may operate at a longer or farther distance from the reader circuit. The range for a passive RFID system is typically readable up to 82 feet (25 meters), while an NFC system is typically readable at a range of less than 10 inches (25 centimeters) and in some embodiments NFC systems have an operating range of several inches.

In one embodiment, the NFC communications module 58 is a dual-interface memory/tag device such as the M24SR series NFC tags manufactured by ST Microelectronics N.V. for example. A dual-interface memory device includes a wireless port that communicates with an external NFC reader, and a wired port that connects the device with another circuit. It should be appreciated that the NFC communications module 58 may sometimes colloquially be referred to as a "tag."

As will be discussed in more detail below, the human-centric robot 24 may be configured to perform one or more noncontact measurements of the object 56. In one embodiment, the NFC communications module data acquired by these noncontact measurements may be transmitted from the reader circuit 44 to the NFC communications module 58. In one embodiment, this noncontact measurement data may be transmitted from the NFC communications module 58 to a processing circuit associated with the object 56. It should be appreciated that this may provide advantages in reducing costs and increasing reliability, such as by allowing processing circuit of the object 56 to use the communicated measurement data for calibration of the object without intervention from the human operator for example. In one embodiment, a calibration member 57 may be mounted on or located near the work surface 22. The calibration member 57 may be a card with a pattern, such as a checker board for example, or a three-dimensional object having known parameters for example.

Figure 2:
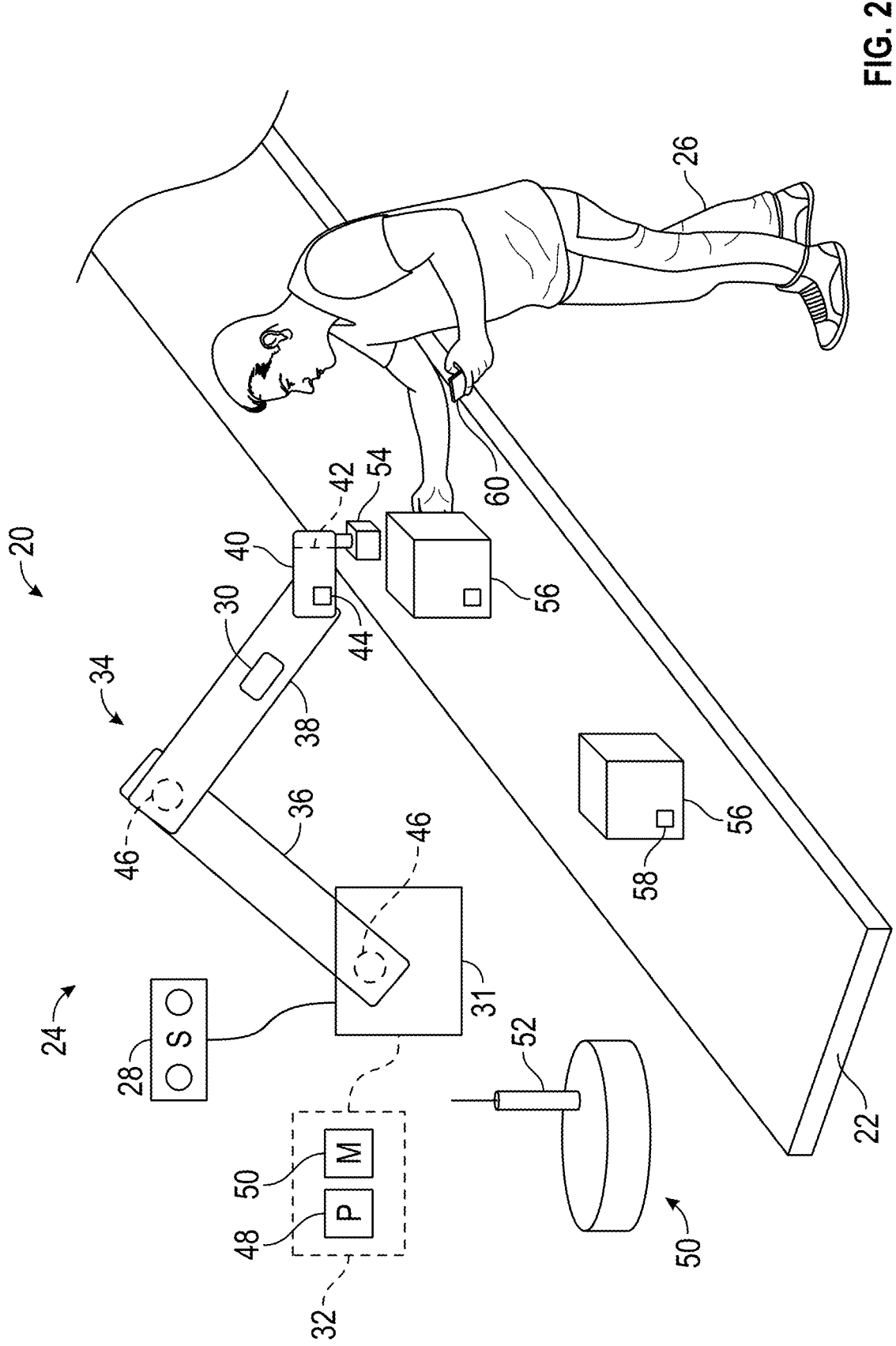
FIG. 2 is an illustration of the manufacturing cell of FIG. 1 with a noncontact measurement device being operated by the human-centric robot.

The human-centric robot 24 is configured to selectively remove and store tools 52 and measurement devices 54 in the tool magazine 50. The selection of the tool 52 or measurement device 54 may be autonomously or semi-autonomously performed by the human-centric robot 24, such as in response to a signal from the NFC communications module 58 for example. In one embodiment, shown in FIG. 2, the human-centric robot 24 may select the noncontact measurement device 54 and couple the stem or gripper portion to the coupler 42. The human-centric robot 24 then moves the arm 34 to position the noncontact measurement device 54 adjacent to the object 56 to perform one or more predetermined measurements. As discussed above the measurements may be defined for the human-centric robot 24 by manufacturing process instruction data or inspection data transmitted by the NFC communications module 58 for example.

It should be appreciated that the human operator 26 may be performing other operations on the object 56 in close proximity to the arm 34 while the measurements are being acquired by the noncontact measurement device 54. In one embodiment, the human-centric robot 24 may include a user interface, such as a display or monitor for example, that provides information such as the measurement data for example to the human operator 26 in real-time or in near real-time. This provides advantages in allowing the human operator 26 to make changes or adjustments to the object 56, such as for calibration purposes or to adjust the object's performance for example.

In one embodiment, the user interface may be remote from the human-centric robot 24, such as application software executed on a mobile device (e.g. a cellular phone, tablet, laptop or wearable computing device). The wearable device may be, for example, glasses having a display that shows the user the data/information from the human-centric robot 24 as described herein. The wearable device may also be a watch with a display that shows the user data/information from the human-centric robot 24. The wearable device may further be an article such as a badge, ring, broach or pendant, that either displays information from the human-centric robot 24. It should be appreciated that these wearable devices may also indicate or display a subset of the data/information, for example, a ring may have an indicator that changes color based on a measurement parameter (e.g. the measurement was successfully acquired). The wearable device and other portable computing devices each have a processor and memory that is configured to execute computer instructions on the respective processor to perform the functions described herein. In still another embodiment, the user interface may be an audio speaker operably coupled to the controller 32 that allows the human-centric robot 24 to communicate information or instructions to the human operator 26 using audibly, such as with spoken (e.g. English) words or audible tone codes.

Figure 3:
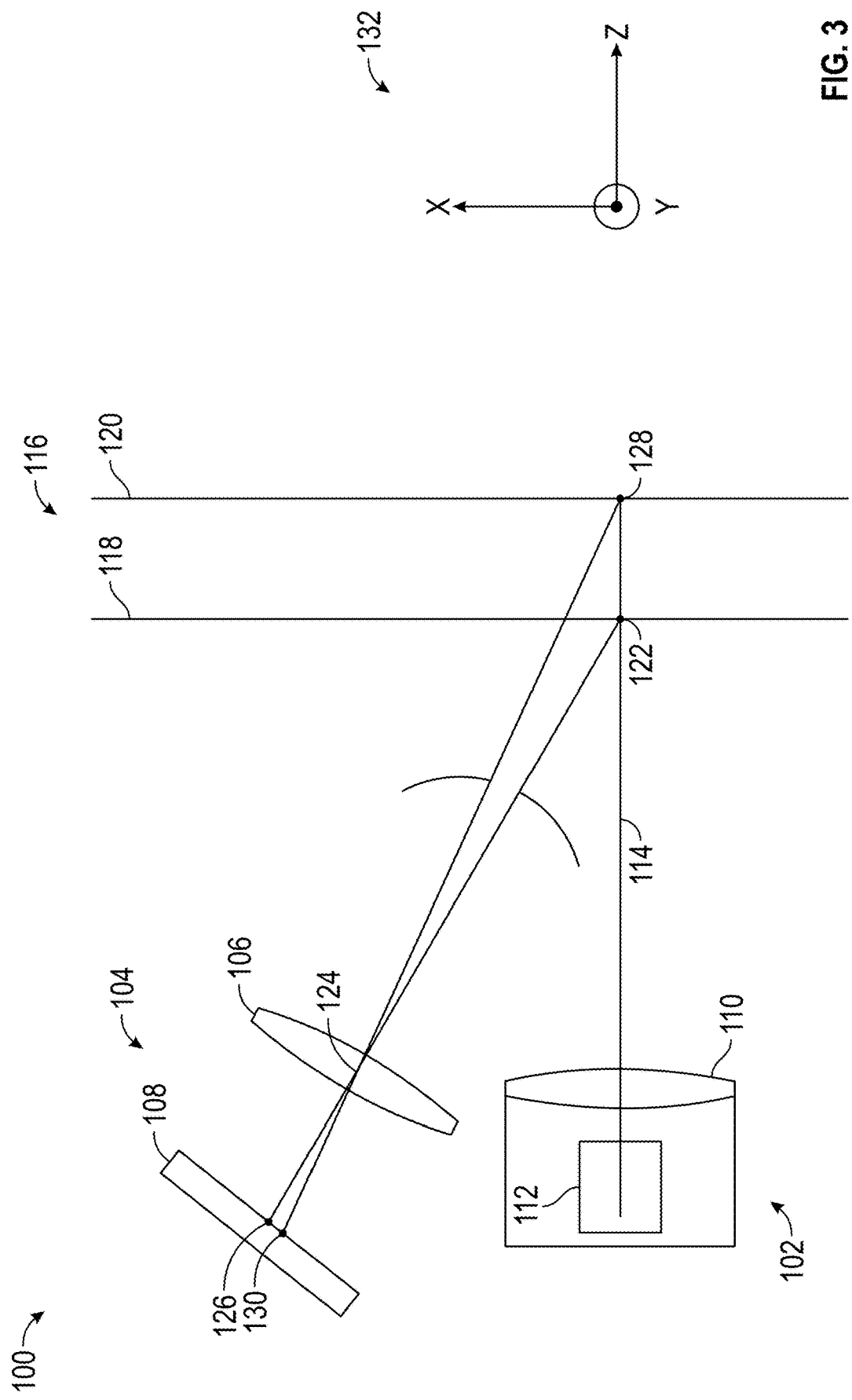
FIG. 3 is a schematic illustration of a noncontact measurement device for use with the human-centric robot of FIG. 1.
Figure 4:
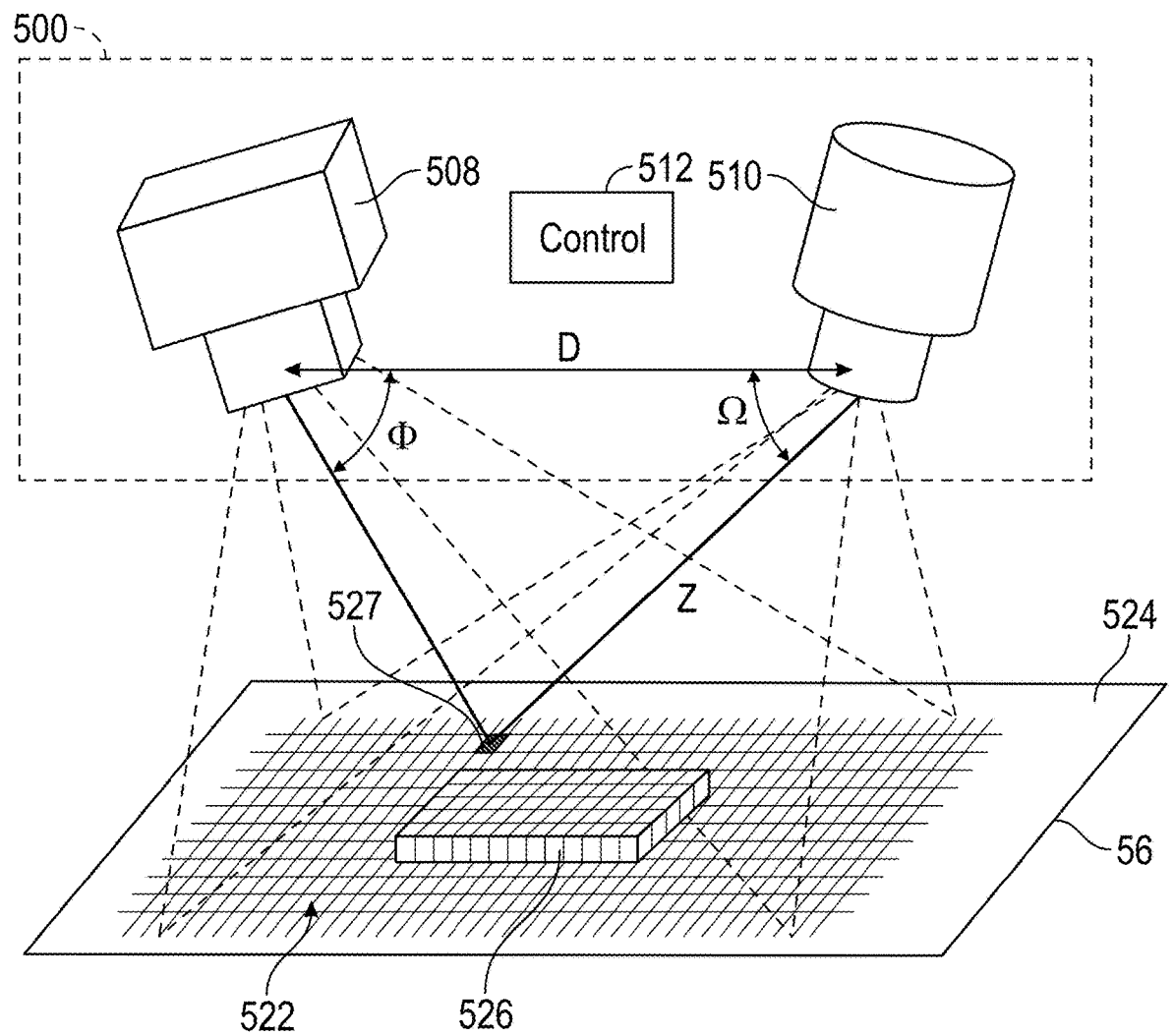
FIG. 4 and FIG. 5 are schematic illustrations of another noncontact measurement device for use with the human-centric robot of FIG. 1.
Figure 5:
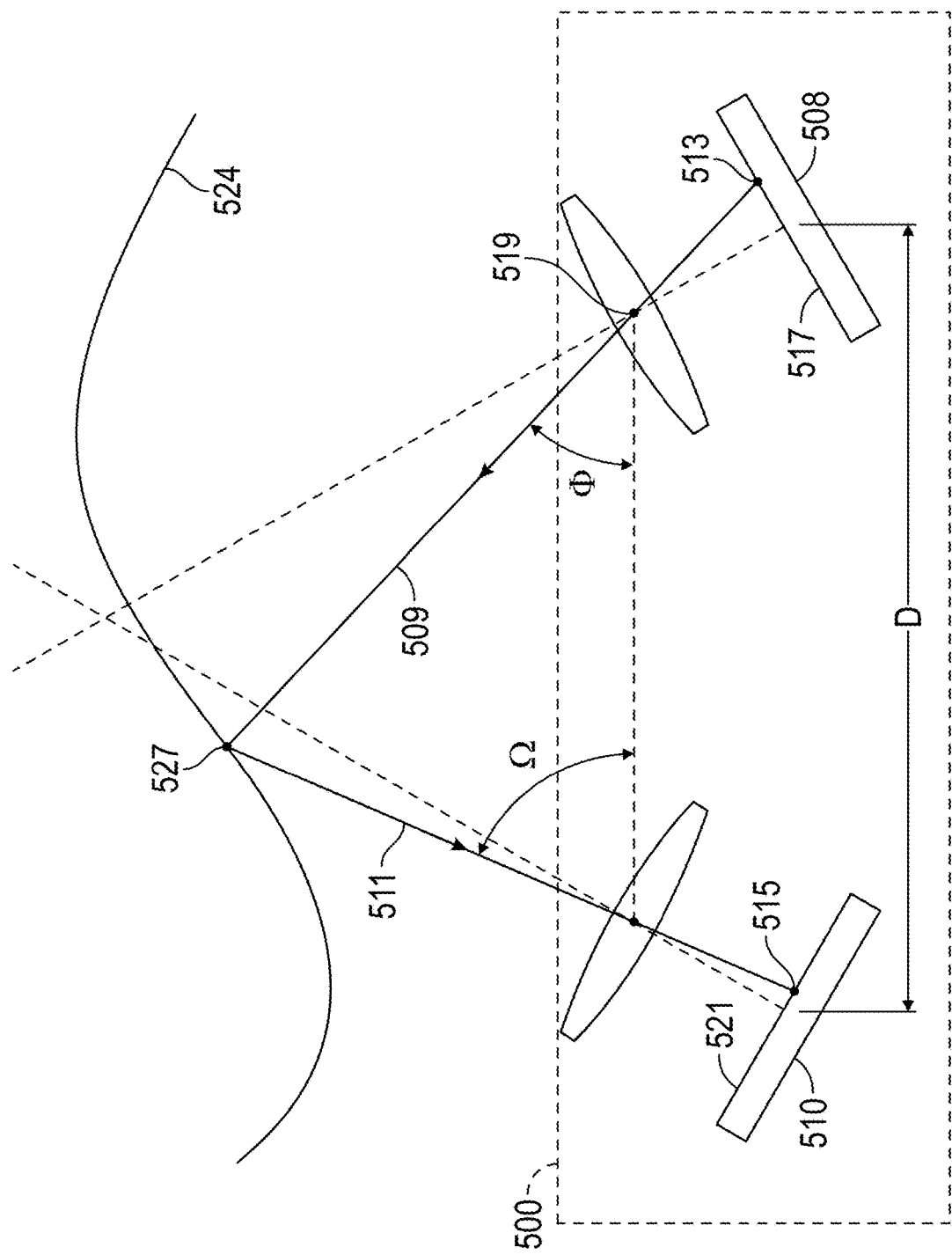

In the exemplary embodiment, the noncontact measurement device 54 may be a laser line probe (FIG. 3) or a structured light scanner (FIG. 4 and FIG. 5). Referring now to FIG. 3, a noncontact measurement device 54 that is a laser line probe 100 will be described. The line scanner 100 includes a projector 102 and a camera 104, the camera including a lens system 106 and a photosensitive array 108 and the projector including an objective lens system 110 and a pattern generator 112. The projector 102 projects a line 114 (shown in the figure as projecting out of the plane of the paper) onto the surface 116 of an object 56, which may be placed at a first position 118 or a second position 120. Light scattered from the object 56 at the first point 122 travels through a perspective center 124 of the lens system 106 to arrive at the photosensitive array 108 at position 126. Light scattered from the object at the second position 128 travels through the perspective center 124 to arrive at position 130. By knowing the relative positions and orientations of the projector 102, the camera lens system 106, the photosensitive array 108, and the position 126 on the photosensitive array, it is possible to calculate the three-dimensional coordinates of the point 122 on the object 56 surface. Similarly, knowledge of the relative position of the point 130 rather than 126 will yield the three-dimensional coordinates of the point 128. The photosensitive array 108 may be tilted at an angle to satisfy the Scheimpflug principle, thereby helping to keep the line of light on the object surface in focus on the array.

One of the calculations described herein above yields information about the distance of the object from the line scanner. In other words, the distance in the z direction, as indicated by the coordinate system 132. The information about the x position and y position of each point 122 or 128 relative to the line scanner is obtained by the other dimension of the photosensitive array 108, in other words, the y dimension of the photosensitive array. Since the plane that defines the line of light as it propagates from the projector 102 to the object is known from the encoder 46 signals of the human-centric robot 24 articulated arm 34, it follows that the x position of the point 122 or 128 on the object surface is also known. Hence all three coordinates—x, y, and z—of a point on the object surface can be found from the pattern of light on the two-dimensional array 108.

Referring now to FIG. 4 and FIG. 5, a noncontact measurement device 54 that is a structured light scanner 500 will be described. As used herein the term "structured light" means a device that projects a pattern having elements there on. As will be discussed below, the structured light pattern may be coded or uncoded.

The scanner 500 first emits a structured light pattern 522 with projector 508 onto surface 524 of an object 56. The structured light pattern 522 may include the patterns disclosed in the journal article "DLP-Based Structured Light 3D Imaging Technologies and Applications" by Jason Geng published in the Proceedings of SPIE, Vol. 7932, the content of which is incorporated herein by reference. The light 509 from projector 508 is reflected from the surface 524 and the reflected light 511 is received by the camera 510. It should be appreciated that variations in the surface 524, such as protrusion 526 for example, create distortions in the structured pattern when the image of the pattern is captured by the camera 510. Since the pattern is formed by structured light, it is possible in some instances for a controller 512 to determine a one to one correspondence between the pixels in the emitted pattern, such as pixel 513, for example, and the pixels in the imaged pattern, such as pixel 515 for example. The correspondence between the pixels may be performed by a processing circuit 512 within the structured light scanner 500, or the acquired data may be transmitted to the controller 32.

Determining the correspondence between pixels enables the use of triangulation principals in determining the coordinates of each pixel in the imaged pattern. The collection of three-dimensional coordinates of the surface 524 is sometimes referred to as a point cloud. By moving the scanner 500 over the surface 524 with the arm 34, a point cloud may be created of the object 56.

To determine the coordinates of the pixel, the angle of each projected ray of light 509 intersecting the object 522 in a point 527 is known to correspond to a projection angle phi (Φ), so that Φ information is encoded into the emitted pattern. In an embodiment, the system is configured to enable the Φ value corresponding to each pixel in the imaged pattern to be ascertained. Further, an angle omega (Ω) for each pixel in the camera is known, as is the baseline distance "D" between the projector 508 and the camera. Therefore, the distance "Z" from the camera 510 to the location that the pixel has imaged using the equation:

$$\frac{Z}{D} = \frac{\sin(\Phi)}{\sin(\Omega + \Phi)} \quad (1)$$

Thus three-dimensional coordinates may be calculated for each pixel in the acquired image.

In general, there are two categories of structured light, namely coded and uncoded structured light. A common form of uncoded structured light relies on a striped pattern varying in a periodic manner along one dimension. These types of patterns are usually applied in a sequence to provide an approximate distance to the object. Some uncoded pattern embodiments, such as the sinusoidal patterns for example, may provide relatively highly accurate measurements. However, for these types of patterns to be effective, it is usually necessary for the scanner device and the object to be held stationary relative to each other. In one embodiment, the scanner 500 may use an uncoded pattern where the object or scanner is not stationary. In this embodiment, the scanner 500 may be the type described in commonly owned U.S. patent application Ser. No. 13/767,167 entitled "Device for Optically Scanning and Measuring an Environment" filed on Feb. 14, 2013, the content of which is incorporated herein by reference.

Where the scanner device or the object are in motion (relative to the other), then a coded pattern may be desired. A coded pattern allows the image to be analyzed using a single acquired image. Some coded patterns may be placed in a particular orientation on the projector pattern (for example, perpendicular to epipolar lines on the projector plane), thereby simplifying analysis of the three-dimensional surface coordinates based on a single image.

Epipolar lines are mathematical lines formed by the intersection of epipolar planes and the source plane 517 or the image plane 521 (the plane of the camera sensor) in FIG. 5. An epipolar plane may be any plane that passes through the projector perspective center 519 and the camera perspective center. The epipolar lines on the source plane 517 and the image plane 521 may be parallel in some cases, but in general are not parallel. An aspect of epipolar lines is that a given epipolar line on the projector plane 517 has a corresponding epipolar line on the image plane 521. Therefore, any particular pattern known on an epipolar line in the projector plane 517 may be immediately observed and evaluated in the image plane 521. For example, if a coded pattern is placed along an epipolar line in the projector plane 517, the spacing between the coded elements in the image plane 521 may be determined using the values read out of the pixels of the camera sensor 510. This information may be used to determine the three-dimensional coordinates of a point 527 on the object 56. It is further possible to tilt coded patterns at a known angle with respect to an epipolar line and efficiently extract object surface coordinates.

In embodiments having a periodic pattern, such as a sinusoidally repeating pattern, the sinusoidal period represents a plurality of pattern elements. Since there is a multiplicity of periodic patterns in two-dimensions, the pattern elements are non-collinear. In some cases, a striped pattern having stripes of varying width may represent a coded pattern.

Figure 6:
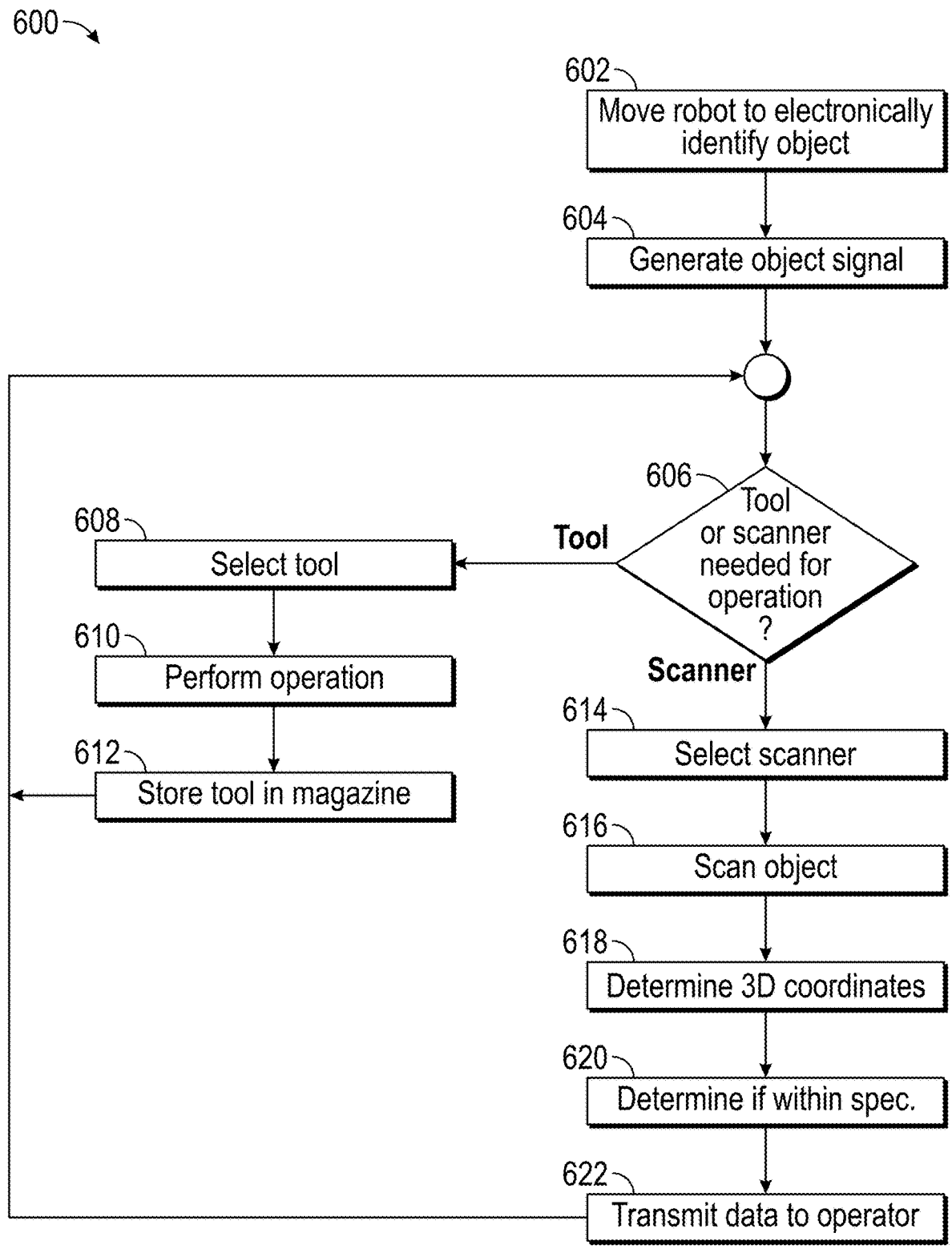
FIG. 6 is a flow diagram of a method of operating the human-centric robot of FIG. 1.

Referring now to FIG. 6, a method 600 of operating the manufacturing cell 20 is shown in accordance with one embodiment of the invention. The method 600 initiates in block 602 where the human-centric robot 24 electronically identifies the object 56. This may be done for example by moving the arm 34 to place the end effector 40 in close proximity to the object 56 such that the reader circuit 44. It should be appreciated that when the communications module 58 is within the reader circuit's 44 range is an object signal may be transmitted from the communication module 58. As used herein the reader circuit's 44 range is the distance at which an reader circuit 44 can detect a signal from an external device. In one embodiment, the signal may be in the form of a modulation of the waveform transmitted by the reader circuit 44. As discussed above, the object signal may include data associated with the object 56, such as but not limited to manufacturing process steps, inspection steps and product identification for example. The object signal is generated in block 604. Upon receipt by the controller 32, the controller determines in query block 606 whether a tool 52 or a noncontact measurement device 54 is to be used in operation. It should be appreciated that in some embodiments, both a tool 52 and a noncontact measurement device 54 may be used with the object 56.

In some instances, a tool 52 will be used first, such as to tighten a fastener or drill a hole for example. The method 600 then proceeds to block 608 where the tool 52 is removed from the tool magazine 50. The human-centric robot 24 then proceeds to perform the operation (e.g. tighten a fastener, couple sub-assemblies) in block 610. Once the operation is complete, the method 600 stores the tool 52 in magazine 50 in block 612. The method 600 then loops back to determine if the next sequence of the operation uses a tool 52 or a noncontact measurement device 54.

If query block 606 determines that a measurement is to be taken of the object 54, the method 600 proceeds to block 614 where the noncontact measurement device 54 is retrieved from the tool magazine 50. In the exemplary embodiment, the human-centric robot 24 couples the stem or gripper portion of the noncontact measurement device to the coupler 42 on the end effector 40. The human-centric robot 24 then positions the arm 34 to allow the noncontact measurement device 54 to measure the desired features of the object 56. In some embodiments, it may be desirable to perform a compensation process with the noncontact measurement device 54 prior to measuring the object 56. The compensation process typically includes measuring article or articles or a known size, such as but not limited to a plate, a sphere or a plurality of targets for example.

The method 600 then proceeds to block 616 where the object 56 is scanned and the desired measurements are obtained in block 618. The method 600 then proceeds to perform some predetermined analysis. In the exemplary embodiment, the analysis includes determining if the measurements are within a predetermined specification in block 620. The predetermined specification value may have been transmitted for example in the data contained in the object signal. Other types of analysis may also be provided, such as determining a compensation value or calibration parameter for the object 56 for example. The method 600 then proceeds to block 622 where the measurement data or the comparison of the measurements to the predetermined specification value is transmitted to the operator 26. It should be appreciated that the method 600 may also take other steps, such as transmitted data to the communications module 58 for example, or providing an alarm or alert if the measured values deviate from an acceptable criteria.

Finally, the method 600 then loops back to determine if the next sequence of the operation uses a tool 52 or a noncontact measurement device 54. This process continues until the desired sequence of steps being performed by the human-centric robot is completed. It should be appreciated that where the human-centric robot 24 has multiple articulated arms; these steps may be carried out in parallel for example. Further, while embodiments refer to a tool magazine, in other embodiments the tool magazine may be omitted and the human-centric robot 24 utilizes sensors, such as sensor 28 for example, to identify the tools 52 and noncontact measurement devices 54 on a work surface. In still other embodiments, the human-centric robot 24 cooperates with the human operator 26 to guide the human operator 26 in the manufacturing steps being performed on the object 56, such as by using the noncontact measurement device 54 to measure the position of a tool 60 being used by the human operator 26.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system comprising:
    an articulated arm having a plurality of arm segments, each of the arm segments having a transducer;
    an end effector coupled to an end of the articulated arm;
    an electronic circuit configured in operation to determine a position and orientation of the end effector;
    at least one sensor that measures in operation a position of an operator;
    at least one tool removably coupled to the end effector;
    a three-dimensional (3D) scanner configured in operation to determine three-dimensional coordinates of a surface of an object, the 3D scanner being removably coupled to the end effector; and
    a controller having a processor, the processor configured to execute computer executable instructions when executed on the processor to determine when the operator is within a predetermined distance of the articulated arm and altering a speed or a movement of the articulated arm to avoid contact or reduce the impact of contact between the operator and the articulated arm.

2. The system of claim 1, wherein the at least one sensor is a visual sensor.

3. The system of claim 2, wherein the visual sensor includes stereoscopic camera.

4. The system of claim 2, wherein the at least one sensor further includes a localized sensor.

5. The system of claim 4, wherein the localized sensor is a load cell or a proximity sensor.

6. The system of claim 1, wherein the end effector includes a reader circuit, the reader circuit acquiring in operation a machine readable code.

7. The system of claim 1, wherein the machine readable code is one of an optical code, a bar code, an electromagnetic radiation code, or an audible code.

8. The system of claim 7, wherein the controller is further responsive for selectively coupling one of the at least one tool or the 3D scanner to the end effector in response to an object signal.

9. The system of claim 1, wherein the controller is further responsive for transmitting an alarm signal when the three-dimensional coordinates deviate from a criteria.

10. The system of claim 1, wherein the controller is further responsive for determining three-dimensional coordinates of an object with the 3D scanner and transmitting the three-dimension coordinates to a processing circuit associated with the object.

11. A method of operating a manufacturing cell, the method comprising:
    providing a robotic articulated arm, the articulated arm having a movable end effector and a plurality of transducers arranged to transmit a position signal to an electric circuit, the robot further including at least one sensor configured to transmit a position signal for determining a position of a human operator, the robot configured to operate directly adjacent to a human operator based at least in part on the position signal;
    providing at least one tool;
    providing a three-dimensional (3D) scanner;
    receiving an object signal;
    coupling the 3D scanner to the end effector in response to receiving the object signal;
    determining three-dimensional coordinates of at least one feature of the object with the 3D scanner coupled to the end effector; and
    transmitting the three-dimensional coordinates to a processing circuit associated with the object;
    calibrating the object based on the three-dimensional coordinates transmitted to the processing circuit.

12. The method of claim 11, wherein the calibrating of the object includes determining a compensation value or a calibration parameter.

13. The method of claim 11, further comprising:
    receiving a second object signal;
    coupling the at least one tool to the end effector in response to receiving the second object signal; and
    performing a first operation on an object being assembled with at least one of the end effector or the at least one tool.

14. The method of claim 11, further comprising:
    determining from the position signal a distance between the operator and the robotic articulated arm is less than a predetermined distance;
    changing at least one of a speed or a movement of the robotic articulated arm to avoid contact or reduce the impact of contact between the operator and the articulated arm.

15. The method of claim 14, wherein the sensor is a visual sensor.

16. The system of claim 15, wherein the at least one sensor is a visual sensor.

17. The system of claim 16, wherein the visual sensor includes stereoscopic camera.

18. The system of claim 15, wherein the at least one sensor further includes a localized sensor.

19. The system of claim 18, wherein the localized sensor is a load cell or a proximity sensor.

20. The method of claim 11, further comprising transmitting an alarm signal when the three-dimensional coordinates deviate from a criteria.

* * * * *